Patented Mar. 24, 1931

1,797,260

UNITED STATES PATENT OFFICE

EDWARD HORACE ELLMS, OF ENGLEWOOD, NEW JERSEY, ASSIGNOR TO THE BARRETT CO., OF NEW YORK, N. Y., A CORPORATION OF NEW YORK

PRODUCTION OF PARACOUMARONE RESINS

No Drawing.　　Application filed August 14, 1928. Serial No. 299,632.

My invention pertains to an improved paracoumarone resin which is characterized by its ability to form stable emulsions in water and oil such as "spindle oil". My invention also relates to a process for producing such a resin.

It is well known that when naphtha or similar coal tar oils containing coumarone or indene are treated with sulfuric acid the coumarone and indene are polymerized. When the naphtha containing the polymerized coumarone and indene in solution is separated from the polymerizing acid, neutralized with a solution of an alkali, separated from the alkaline solution, washed and distilled to remove unpolymerized material, the polymerized coumarone and indene remain behind in the still as a liquid which solidifies to a resin on cooling. This resin is commonly known as paracoumarone or "Cumar".

The naphtha after the polymerization with sulfuric acid retains in suspension a small amount of sulfuric acid and of sulfonic acids formed by the reaction of some of the polymerizing acid upon certain of the constituents of the naphtha. Before this polymerized naphtha can be satisfactorily distilled to recover the resins these last traces of acid must be neutralized by agitating the naphtha with a solution of alkali, as, for example, sodium hydroxide. If this neutralization step is omitted, the small amounts of acid retained by the naphtha will cause the resin obtained by the distillation of the naphtha to be dark in color and less valuable in the arts.

After neutralization of the naphtha the major portion of the alkaline solution (containing small amounts of sodium sulfate and sodium sulfonates) separates readily from the naphtha and may be drawn off. By washing the naphtha with water or salt solutions it is possible to remove the remaining salts. The washed residue is then ordinarily distilled to remove unpolymerized material, the paracoumarone resin remaining in the still.

Attempts have been made in the past to produce relatively permanent emulsions of paracoumarone resin with water, oils, such as spindle oil, and a small amount of soap. While these attempts were sometimes partly successful, the emulsions frequently broke down on standing, allowing an oily layer to separate. No explanation has been available for the contradictory results obtained, except that the quality of the emulsion seemed to vary with the resin used.

I have now discovered that a paracoumarone resin capable of forming a stable emulsion may be prepared by a controlled modification of the washing process whereby the total ash is kept within certain limits and a balance is maintained between certain of the ash-forming ingredients. The ash-forming constituents of the resin comprise, principally, two types of substances: metal sulfates, principally sodium sulfate; and sodium salts of organic sulfonic acids. These organic sulfonic acids result from sulfonation during polymerization of the naphtha and are converted to the sodium salts during neutralization. They are soluble in the coal tar oil to a considerable extent. In practice, I designate these sodium salts of the organic sulfonic acids by the general formula $RSO_3Na$. In addition to the sulfates and sulfonates, a small part of the ash may be due to the presence of traces of iron oxides, silica, etc.

The total ash determined by burning a sample of the resin in a crucible is composed of $Na_2SO_4$ originally present as such, $Na_2SO_4$ formed by the burning or the organic sulfonate salts, and traces of iron oxide, silica, etc. which are so small that they may be calculated as $Na_2SO_4$ without introducing serious error. It is possible, also, that some $Na_2CO_3$ may be present, but this too may be calculated as $Na_2SO_4$ without introducing appreciable error.

I have found that the amount of $Na_2SO_4$ present as such in the resin, as distinguished from the sodium sulfonates also present, may be determined as follows: 20–30 grams of the resin are dissolved in 125 cc. of benzol, the solution transferred to a 500 cc. separatory funnel, and extracted five times with 50 cc. portions of hot water. The liquids are swirled vigorously during each extraction, after which the mixture is allowed to stand till separation, which may be aided by adding a little HCl, occurs. The combined washes are acidified with excess HCl, extracted once or twice with benzene, boiled, extracted again with benzene, and treated with 25 cc. of 0.1 molal BaCl₂ solution. This is digested about an hour, filtered, washed, ignited, and weighed in the usual manner.

The weight of BaSO₄ calculated to Na₂SO₄ gives the amount of Na₂SO₄ present as such in the sample of resin. This Na₂SO₄, subtracted from the total Na₂SO₄ as determined by ashing, leaves the Na₂SO₄ resulting from the burning of the sodium salts of the organic sulfonic acids present in the resin. This latter amount I designate by the term "sulfonate ash".

I have now discovered that a paracoumarone resin capable of forming stable emulsions with water, oils, such as spindle oil, and soap may be prepared by controlling the previously described washing step of the process so that the total ash-forming constituents remaining in the resin after treatment, and the ratio of sulfonate ash to sulfate ash, both fall within a certain range when determined by the above method. The total ash of such a resin should lie within the range 0.3%–1.9%, and the ratio of sulfonate ash to Na₂SO₄ as such, i.e., sulfonate ash/Na₂SO₄ as such, should be not less than 10 in the case of low ash material, 1.5 in the case of high ash material, and a value varying preferably substantially uniformly between these limits for intermediate ash contents. The melting point of the resin should be not less than 30° C. and preferably not less than 35° C. The upper limit of melting point is not sharply defined.

I have found that when the naphtha containing the previously polymerized paracoumarone resins is washed, after neutralization, the sodium sulfate is removed more rapidly than the sodium salts of the organic sulfonates. In the past it has been customary to wash out the ash-producing materials,—i.e., sodium sulfate and sodium sulfonates—as completely as possible without employing excess washing time and with no regard to the ratio between them. In accordance with this invention I control the washing so that a resin of the desired properties is produced. For example, I may withdraw a sample of naphtha after each washing, distill to the desired melting point, and determine the quantity and composition of the ash as previously described. When the ash quantity and composition have come within the desired range the washing is stopped and the naphtha distilled off from the resin.

I may also prepare an emulsifying resin by blending certain special products, high in sulfonate ash, with ordinary paracoumarone resin which does not contain the correct quantity and composition of ashing ingredients. I have found that "sludge paracoumarone" and "paracoumarone soap" are suitable blending ingredients.

*Sludge paracoumarone*

In the operation of a paracoumarone resin plant a sludge composed mainly of residues from the acid settling and neutralization steps is produced as a by-product. Resin made from this material, which I designate as "sludge paracoumarone", contains about 9.5% total ash, of which a large proportion is sulfonate ash. I may produce a paracoumarone resin suitable for making emulsions by blending sufficient sludge paracoumarone with ordinary paracoumarone resin to produce a product having the previously described properties which permit its emulsification. The proportions of the materials blended will naturally depend on the exact analysis of the components.

*Paracoumarone soap*

I may produce "paracoumarone soap" by steam-distilling the aqueous solution obtained from the "first wash" of the naphtha until foaming prevents further distillation. The first wash will thus yield about 37.3% paracoumarone soap; 13.0% crude Hi-Flash naphtha; and 49.7% water; though the proportions will, of course, vary with the effectiveness of the wash. A typical paracoumarone soap, thus produced, contained about 10.5% total ash of which about 6.03% was sulfonate ash. I may produce a paracoumarone resin suitable for making emulsions by blending the paracoumarone soap with ordinary paracoumarone resin in such proportions that the mixture has the properties hereinabove specified.

In the above description sodium hydroxide has been used as an example of the alkaline agent for neutralizing the polymerized naphtha. It should be understood that the invention is not limited to the use of sodium hydroxide but contemplates the use of other alkalies or alkaline materials which act in the same manner as sodium hydroxide.

I claim:

1. A paracoumarone resin containing sodium sulfonates and sodium sulfate, the sulfonate ash being greater than the Na₂SO₄ present as such in the resin, and the total ash of which lies within the range of 0.3% to 1.9%.

2. An emulsifiable paracoumarone resin melting at 30° C. or above and containing sodium sulfonates and sodium sulfate, the sulfonate ash being greater than the Na₂SO₄ present as such in the resin, and the total ash of which lies within the range 0.3% to 1.9%.

3. A paracoumarone resin containing sodium sulfonates and sodium sulfate, said compounds being present in such quantities that the total ash lies within the limits 0.3% to 1.9% and the minimum ratio of sulfonate ash to sodium sulfate present as such in the resin varies between 10 in the case of low ash material and 1.5 in the case of high ash material.

4. A paracoumarone resin containing sodium sulfonates and sodium sulfate, said compounds being present in such quantities that the total ash lies within the limits 0.3% to 1.9% and the ratio of sulfonate ash to $Na_2SO_4$ present as such in the resin is not less than 10 in the case of low ash material, 1.5 in the case of high ash material, and a value varying substantially uniformly between these limits for intermediate ash contents.

5. An emulsifiable paracoumarone resin melting at 30° C. or above, and containing sodium sulfonates and sodium sulfate, said compounds being present in such quantities that the total ash lies within the limits 0.3% to 1.9% and the ratio of sulfonate ash to $Na_2SO_4$ present as such in the resin is not less than 10 in the case of low ash material, 1.5 in the case of high ash material, and a value varying substantially uniformly between these limits for intermediate ash contents.

6. In a process for producing paracoumarone resin, the step which comprises altering the quantities of sodium sulfonates and sodium sulfate present so that the ash from the former exceeds that from the latter, and so that the total ash lies within the limits 0.3% to 1.9%.

7. In a process for producing paracoumarone resin, the step which comprises altering the quantities of sodium sulfonates and sodium sulfate present so that the total ash lies within the limits 0.3% to 1.9% and the ratio of sulfonate ash to sulfate ash present as such in the resin is not less than 10 in the case of low ash material, 1.5 in the case of high ash material, and a value varying substantially uniformly between these limits for intermediate ash contents.

8. In the process for producing paracoumarone resin from naphtha, the step which comprises washing the previously neutralized naphtha containing the paracoumarone resin, until the total ash from the product lies within the limits 0.3% to 1.9% and the ratio of sulfonate ash to sodium sulfate present as such in the resin varies from a minimum of 10 in the case of low ash material to a minimum of 1.5 in the case of high ash material.

9. In the process for producing paracoumarone resin from naphtha, the step which comprises washing the previously neutralized naphtha containing the paracoumarone resin, until the total ash from the product lies within the limits 0.3% to 1.9% and the sulfonate ash exceeds the sodium sulfate present as such in the resin.

10. In the process for producing paracoumarone resin from naphtha, the step which comprises washing the previously neutralized naphtha containing the paracoumarone resin until the total ash from the product lies within the range 0.3% to 1.9% and the ratio of sulfonate ash to sodium sulfate present as such in the resin is not less than 10 in the case of low ash material, 1.5 in the case of high ash material, and a value varying substantially uniformly between these limits for intermediate ash contents.

In witness whereof, I have hereunto set my hand.

EDWARD H. ELLMS.